Patented Jan. 5, 1943

2,307,234

UNITED STATES PATENT OFFICE 2,307,234

CONCENTRATED LIQUID ICE CREAM MIX

Herbert E. Otting, Westerville, and James J. Quilligan, Columbus, Ohio, assignors to M & R Dietetic Laboratories, Inc., a corporation of Ohio No Drawing. Application July 20, 1940, Serial No. 346,652

9 Claims. (Cl. 99—136)

This invention relates to a concentrated liquid ice cream mix, containing a higher than normal percentage of lactose or milk sugar in solution in the aqueous medium of the concentrate, and to the method of making the same.

It has been a problem in the ice cream making industry to produce a relatively high lactose content concentrated liquid ice cream mix which is free from crystallized lactose or milk sugar. In accordance with the prior art methods of preparing concentrated liquid ice cream mixes containing a lactose or milk sugar content in excess of that normally capable of being maintained in solution by the water of the concentrate, the excess lactose invariably crystallized and precipitated from solution. Since in use these concentrates are reconstituted or cut back with water or a milk product and then frozen to form ice cream, the lactose crystals are found dispersed throughout the ice cream and thus impart thereto an objectionable rough or sandy consistency which in the trade, is termed "sandiness." In consequence, the concentrates of the prior art were made to contain a relatively low lactose content, usually less than, and in no instances more than, the amount of lactose or milk sugar that would normally remain in solution in the aqueous medium of the concentrate. From experience, it has been found that the amount of lactose or milk sugar that will be dissolved and maintained in solution normally by the concentrate is, in general, approximately 15% of the water content of the concentrate or mix. In the case of a concentrated liquid ice cream mix having a 74% total solids content, for example, the aqueous medium thereof will normally hold in solution approximately 3.90% of lactose.

We have found that, by operating in accordance with the present invention, we can produce a concentrated liquid ice cream mix having a dissolved content of lactose considerably in excess of that capable of being normally held in solution by the water of the concentrate. Thus we have found that if all or part of the milk solids not fat content of the concentrated liquid ice cream mix is a base exchange treated milk solids not fat, the resulting concentrate may be made to contain in solution a relatively high lactose content, considerably in excess of that normally capable of being held in solution by the water or milk of the concentrate, say, in the order of about 45% to about 55% more lactose than heretofore, and even higher, with all of the lactose apparently present in the concentrate in a dissolved state.

While we have not been able to definitely account for this phenomenon, it is our opinion that the treatment of milk or like milk products containing milk solids not fat with base exchange materials, as hereinafter described, causes a change in the colloidal materials present in the milk which, in the mix, effectively prevents precipitation and crystallization of the substantial amounts of lactose or milk sugar in excess of that normally capable of being held in solution by the water of the concentrate at the temperatures when this excess of lactose would otherwise normally crystallize. The treated milk solids appear to enable the water in the ice cream concentrate to carry in solution more than the usual approximately 15% of the water content of lactose or milk sugar at normal room temperatures. While an excess over this amount of lactose in an ice cream concentrate prepared in accordance with prior art methods will precipitate and crystallize out at normal room temperatures, with an ice cream concentrate in accordance with our invention, having in the order of about 45% to 55% more lactose than that normally soluble, and even considerably higher, no "sandiness" develops at room temperatures or even after prolonged storage or during shipment.

In carrying out our invention, part or all of the milk solids not fat in the form of a liquid milk product, such as whole milk, skim milk, sweetened condensed whole or skim milk, condensed plain whole or condensed plain skim milk, cream or the like, are treated with or without prior acidification with an active base exchange material. In our preferred practice, the liquid milk products subjected to base exchange treatment are not preliminarily acidified since it appears that unacidified, base exchange treated milk solids have a greater tendency to retard milk sugar crystal formation than is the case when the milk product has been preliminarily acidified before treatment.

The base exchange treatment may be effected in any desirable manner, either as a batch or continuous process. Thus, we may charge whole milk, skim milk or like products containing milk solids not fat into a vessel provided with a suitable amount of fine grained base exchange material and effect contact as by agitation of the mixture in any desirable manner, as in a churn or the like; or the whole milk or like products containing milk solids not fat may be passed downwardly or upwardly through a bed of base exchange material which, if desired, may be provided with agitators to agitate or stir the bed of base exchange material at intervals. If desired, the liquid milk product may be heated prior to contact with the bed of base exchange material to aid in facilitating passage thereof through the bed.

The liquid milk product containing milk solids not fat treated as above described may be used as such, or in evaporated or dessicated and powdered form, as the sole milk solids not fat constituent of the concentrated liquid ice cream mix, or along with untreated milk solids not fat.

The base exchange material used in accordance with our invention may be natural or artificial zeolitic materials, such as zeolites or glauconite, the materials known in the trade as "Permutit," "Refinite," "Crystallite" and the like; or base exchange materials prepared from normally inert materials which have been especially treated and activated, as described in Patent No. 1,954,769 to John F. Lyman, in Patent No. 2,045,097 to one of us, in Patent No. 2,072,903 to one of us and Edwin H. Browne, and in Patent No. 2,102,642 to one of us, Edwin H. Browne and Maurice E. Hull, or organic base exchange materials derived from carbonaceous materials which are sold in the trade and commonly known as "Catex," or organic base exchange materials derived from synthetic resins, or the like.

The following example illustrates the base exchange treatment step of our process and describes, in general, the character of the milk solids not fat produced in accordance with this treatment.

800 gallons of whole milk testing 0.15% acidity, calculated as lactic acid, and having a pH of about 6.50 are passed downwardly through a 12 cubic foot bed of base exchange material of 30 to 60 mesh known in the trade as "Crystallite." After passage of the milk through the bed of base exchange material, a composite sample thereof was tested and found to have an acidity of 0.06% calculated as lactic acid, and a pH of 8.1.

The product resulting from the above treatment analyzed as follows:

|  | Per cent |
|---|---|
| Ash | 0.651 |
| CaO | 0.130 |
| $P_2O_5$ | 0.194 |

The total ash content of the milk product treated in accordance with our invention is less than that of the untreated milk. For purposes of comparison, the comparative analysis of the untreated whole milk was as follows:

|  | Per cent |
|---|---|
| Ash | 0.710 |
| CaO | 0.189 |
| $P_2O_5$ | 0.238 |

In general, the milk product treated with base exchange material in accordance with our invention may be neutral, or may have a titratable acidity of about 0.06% to, say, about 0.25%, or even, if desired, a titratable alkalinity of about 0.06%, the acidity and alkalinity being calculated as lactic acid. The pH of the treated product may vary rather widely from, say, about 6.8 to about 8.20 and even higher. The ash content of the treated product may vary from about 0.610% to about 0.710%; the content of calcium, determined as calcium oxide, is in general not over 0.154% and usually in the range of 0.126% to 0.140%; and the content of phosphorus pentoxide is, in general, not over 0.217% and is usually in the range of 0.193% to 0.211%.

The base exchange treated whole milk or like treated products containing milk solids not fat in accordance with our invention may be concentrated, if desired, and preferably is, prior to blending it with the conventional ingredients to form an ice cream mix; however, this preliminary concentrating step may be omitted. The concentration of the treated milk product may be effected in any desirable manner, for example, under vacuum, to a total solids content of about 30 to about 35% and even higher and a milk solids not fat content of considerable variation depending, of course, on the original fat and solids not fat content of the untreated whole milk or like untreated products. Thus, for example, if the untreated whole milk has a fat content of about 4% and a milk solids not fat content of about 9%, the product resulting from the base exchange and concentrating treatments may have a total solids content of about 35%, of which about 25% is milk solids not fat. The ice cream mix containing unconcentrated or, preferably, concentrated base exchange treated milk is now pasteurized, say, by heating it to about 155° F. and then homogenized in any desired manner under suitable pressure, say, in the order of about 2000 to about 2500 lbs. gauge. The homogenized ice cream mix is now condensed, preferably, under vacuum to a total solids content above 60% and, preferably, of about 65% to about 72.5% or about 73% and up to about 74% and slightly higher, as desired.

The concentrated liquid ice cream mix produced as above described has a smooth consistency and is free from objectionable "sandiness" even when cooled. It may be packaged in suitable hermetically sealed containers and thus dispensed much in the same manner that sweetened condensed milk is now packaged and dispensed. The concentrated ice cream mixes embodying our invention remain stable in the packages even after prolonged storage.

As hereinabove pointed out, we have found that if only part of the desired milk solids not fat content of the concentrate is treated with base exchange material as described above, we can incorporate the remainder of the desired content of milk solids not fat in the form of untreated whole milk, skim milk or the like, either in liquid or dessicated form, along with the other desired ingredients of the ice cream mix and obtain an ice cream concentrate which is free from "sandiness" and which has a lactose content considerably in excess of that normally capable of being held in solution by the water or milk in the concentrate. Thus, for example, we can make up a concentrated liquid ice cream mix having a milk solids not fat content in excess of about 11½% to about 12% and up to about 17% and higher, of which, say, about 10%, and as low as about 2% to about 3.5% may be base exchange treated milk solids not fat, the remainder being untreated milk solids not fat, and still maintain a higher than normal percentage of lactose in solution.

In the preparation of concentrated liquid ice cream mixes having a total solids content, say, in the order of about 65% to about 74%, and somewhat higher, and a milk solids not fat content in the order of about 11½% to 12% and up to about 13% or about 14%, and wherein part or all of the milk solids not fat is base exchange treated, no appreciable or objectionable lactose crystal formation develops in the concentrate even on prolonged storage, although the concentrates contain a lactose content considerably in excess of that normally capable of being held in solution by the water or milk of the concentrate. In the case of concentrated liquid ice cream mixes having a higher milk solids not fat content, say, of about 16% to about 17% and higher, it may be desirable to remove a portion of the excess of lactose, while still having a substantial excess over that normally soluble in the water present. In the preparation of these concentrated liquid ice cream mixes having a higher milk solids not fat content, it is usually desirable to remove, preliminarily, some portion of the lactose from a part or from all of the milk products supplying the milk solids not fat to be used in the concentrate. In our preferred process, we remove some of the lactose from untreated milk or skim milk or from a mixture of untreated and base exchange treated milk or skim milk used in providing the necessary milk solids and then make up the balance of the desired milk solids not fat content with base exchange treated milk solids not fat containing the usual proportions of lactose. The lactose removal may be effected in any desirable manner, but we prefer to utilize the method of Webb and Williams as described in the Journal of Dairy Science, February, 1934, vol. 17, No. 2. Briefly, this procedure, carried out with untreated skim milk, for example, is as follows:

A mixture of about 100 parts by weight of unheated skim milk and about 5.9 parts by weight of sucrose is heated to about 149° F. for about ten minutes and the mixture is evaporated, under vacuum, at a low temperature, to a total solids content of about 70%. It is then immediately cooled to between about 68° F. and about 77° F. and held for sufficient time for lactose or milk sugar crystals to develop. After crystallization takes place, the crystals, if of any substantial size, can be removed either by means of a filter press or in a centrifuge or in any other desirable manner. In general, in the order of about 50% to about 60% of the lactose normally present in the skim milk may be removed in this fashion.

Our concentrated liquid ice cream mixes may vary in total milk solids not fat content (untreated, base exchange treated or mixtures thereof) and in total solids content as described above. They are prepared, using the conventional ice cream ingredients such as butter fat, sugar, salt, stabilizers and the like in varying proportions, to meet any desired requirement in the finished product. Part of the milk solids not fat are supplied from the cream used, along with the butter fat. A typical formula, as in our prior application Serial No. 249,634, now Patent No. 2,233,178, of which this application is a continuation-in-part, contains 17.71% butter fat, 15.26% base exchange treated milk solids not fat, 37.70% sugar, 0.70% sodium alginate, 0.50% egg yoke (dried), 0.20% salt and 27.93% water. Usually in such formulae having a high milk solids not fat and high total solids content as well as in formulae having a higher milk solids not fat and total solids content, it is preferred that part of the lactose be removed from part or all of the milk solids not fat content as described above since, in such instances, the water in the concentrate is usually unable to carry in solution all of the lactose normally present in the milk solids not fat. However, these products contain considerably more lactose in solution than is capable of being maintained normally by the water of the concentrate.

A concentrated mix containing these higher percentages of milk solids not fat and of butter fat may be prepared in the following manner. In this formula the proportion of various final constituents derived from the different ingredients, such as cream, milk and the like, is indicated rather than the proportion of original materials used, since the proportions of butter fat and of milk solids not fat vary in different milks and cream at different times, and the amounts of initial material used can be adjusted readily to secure the desired proportions of constituents in the final product.

In preparing a final product containing 74% total solids, sufficient cream is used to provide about 21.6% butter fat and about 2.7% milk solids not fat, these proportions being somewhat variable depending upon the specific proportion of constituents in the cream. Sufficient skim milk is used to provide approximately 14.3% of milk solids not fat, thereby making up a total of approximately 17% of milk solids not fat in the final mix. While all of the skim milk so used may be base exchange treated, I have found that it is sufficient to so treat only one-fourth to one-half of the skim milk, particularly if there is some reduction of the lactose content of the skim milk or part of the skim milk effected by such a method as that previously described. Thus, if the skim milk is reduced in lactose content so that the final lactose content of the concentrated mix is in the order of about 6% to about 6.5%, it is sufficient that about one-fourth to about one-third of the skim milk used be treated by the base exchange process. Sucrose is added in small amounts and the usual added ingredients such as salt, egg yolk, gelatin and the like are added in an amount not exceeding about 2% to 2½%.

If desired, part of the skim milk may be replaced by milk or condensed milk, in which case a corresponding adjustment of the amount of cream to give the desired butter fat content is made. The cream, skim milk, mixture of skim milk and condensed milk, or of skim milk and milk, part or all of which may be base exchange treated and condensed, and other constituents, are combined in a suitable mixing vat, pasteurized at 155° F. and homogenized, and are then condensed to the desired total solids content in the final mix, as above set forth. In the mixture so derived, the lactose content is in the range from 6 to 7% and is more than 55 to 60% in excess of that which will normally be held in solution without crystallization. The product or concentrated mix so prepared is found not to develop any "sandiness" or apparent crystalline lactose, even on standing for long periods of time. In fact, mixtures have been prepared in accordance with the present invention containing as much as 80 to 100% excess of lactose over the normal solubility limit, and which mixtures do not throw out crystalline lactose or develop "sandiness" for long periods of time.

In use the concentrated ice cream mix is removed from its package and is cut back with a suitable amount, say, 1 to 1½ times its volume of water, whole milk, skim milk or the like, adding the desired flavoring and coloring materials, to form a reconstituted ice cream mix ready to freeze in mechanical freezers or in the known type of refrigerator. In the latter instance we have produced satisfactory ice box ice creams.

Ice cream produced from the concentrated liquid ice cream mixes in accordance with our invention possess natural melting properties, exceptional overrun qualities and other properties required in a good ice cream. Due to the presence of base exchange treated milk products in the concentrates in accordance with our invention, the ice cream prepared therefrom is rendered readily assimilable even by an infant. We have made low fat, high solids not fat, ice cream from concentrated liquid ice cream mixes in accordance with our invention, which has the smoothness, richness and flavor of the highest quality of products, even of very high butter fat products. In addition, ice cream prepared from the concentrates in accordance with our invention are capable of withstanding heat shock during storage.

While we have set forth in the above formulae specific ingredients and proportions thereof, it is obvious that our invention is not to be construed as limited thereto, since certain of the ingredients may be omitted and other equivalent ingredients and other proportions may serve equally as well to produce satisfactory concentrated liquid ice cream mixes. While we have specifically described our invention in connection with the preparation of relatively high milk solids not fat content concentrated liquid ice cream mixes, it is obvious that it is applicable also to the preparation of relatively low milk solids not fat content concentrated liquid ice cream mixes as well as other concentrated liquid mixes of a similar character which may be used for the preparation of other frozen food products such as frosted malted milks, sherbets and the like.

We claim:

1. A concentrated liquid ice cream mix free from sandiness and having a total solids content, including milk solids not fat and lactose, in excess of about 60 to 65%, at least a portion of said milk solids not fat being base exchange treated milk solids not fat, the lactose content of said mix being in excess of that capable of being normally held in solution by the water present in said mix, said lactose being held in solution by said water.

2. A concentrated liquid ice cream mix free from sandiness and having a total solids content, including milk solids not fat and lactose, in excess of about 60 to 65%, all of said milk solids not fat being base exchange treated milk solids not fat, the lactose content of said mix being in excess of that capable of being normally held in solution by the water present in said mix, said lactose being held in solution by said water.

3. A concentrated liquid ice cream mix free from sandiness and having a total solids content, including milk solids not fat and lactose, in excess of about 60 to 65%, at least a portion of said milk solids not fat being base exchange treated milk solids not fat, the lactose content of said mix being at least more than about 45% in excess of that which will normally be held in solution without crystallization, said lactose being held in solution by said water.

4. A concentrated liquid ice cream mix free from sandiness and having a total solids content, including milk solids not fat and lactose, in excess of about 73%, at least a portion of said milk solids not fat being base exchange treated milk solids not fat, the lactose content of said mix being at least more than about 45% in excess of that which will normally be held in solution without crystallization, said lactose being held in solution by said water.

5. A concentrated liquid ice cream mix free from sandiness and having a total solids content, including milk solids not fat and lactose, of about 72.5 to 74%, at least a portion of said milk solids not fat being base exchange treated milk solids not fat, the lactose content of said mix being in the range of from about 6% to about 7%, said lactose being held in solution by the water present in said mix.

6. A concentrated liquid ice cream mix having a lactose content in excess of that normally held in solution by the water present in said concentrated mix and wherein the lactose in excess of that normally held in solution is in solution, said concentrated mix containing a total solids content, including milk solids not fat, in excess of 65%, the milk solids not fat content being in excess of about 11½% to 12%, the concentrated ice cream mix being further characterized in that a portion of the solids therein is base exchange treated milk solids not fat.

7. The method of making a concentrated liquid ice cream mix containing in excess of about 11½% to 12% of milk solids not fat and having a lactose content in excess of that normally held in solution by the aqueous fluid present therein and wherein the lactose in excess of that normally held in solution is in solution, and which can be reconstituted by the addition of an aqueous fluid to form an ice cream mix ready for freezing, comprising treating a liquid containing milk solids not fat with a base exchange substance, thereby modifying the milk solids not fat, incorporating the modified milk solids not fat into a mixture to form an ice cream mix and concentrating the ice cream mix to form a liquid ice cream mix concentrate having a total solids content, including milk solids not fat, in excess of about 65% and a total milk solids not fat content in excess of about 11½% to 12%.

8. The method of making a concentrated liquid ice cream mix having a lactose content in excess of that capable of being normally held in solution by the water present therein and wherein all of said lactose is in solution, and which can be reconstituted by the addition of an aqueous fluid to form an ice cream mix ready for freezing, comprising treating a liquid containing milk solids not fat with a base exchange substance, thereby modifying the milk solids not fat, incorporating the modified milk solids not fat into a mixture to form an ice cream mix and concentrating said mix to form a concentrate having a total solids content in excess of about 65%.

9. The method of making a concentrated liquid ice cream mix having a lactose content in excess of that capable of being normally held in solution by the water present therein and wherein all of said lactose is in solution, and which can be reconstituted by the additon of an aqueous fluid to form an ice cream mix ready for freezing, comprising treating a liquid containing milk solids not fat with a base exchange substance, thereby modifying the milk solids not fat, incorporating the modified milk solids not fat along with unmodified milk solids not fat into a mixture to form an ice cream mix and concentrating said mix to form a concentrate having a total solids content in excess of about 65%.

HERBERT E. OTTING.
JAMES J. QUILLIGAN.

CERTIFICATE OF CORRECTION.

Patent No. 2,307,234. January 5, 1943.

HERBERT E. OTTING, ET AL.

It is hereby certified that error appears in the printed specification of the above numbered patent requiring correction as follows: Page 2, first column, line 63, for "0.25%" read --0.025%--; and that the said Letters Patent should be read with this correction therein that the same may conform to the record of the case in the Patent Office.

Signed and sealed this 16th day of February, A. D. 1943.

(Seal)

Henry Van Arsdale,
Acting Commissioner of Patents.